US012751440B2

(12) United States Patent
Champa et al.

(10) Patent No.: US 12,751,440 B2
(45) Date of Patent: Oct. 6, 2026

(54) FISHING EQUIPMENT CARRIER

(71) Applicant: Thule Sweden AB, Hillerstorp (SE)

(72) Inventors: Calvin Champa, Harwinton, CT (US); Daniel Wesolowski, North Creek, NY (US); Johan Larsson, Jönköping (SE)

(73) Assignee: Thule Sweden, AB, Hillerstorp (SE)

( * ) Notice: Subject to any disclaimer, the term of this patent is extended or adjusted under 35 U.S.C. 154(b) by 0 days.

(21) Appl. No.: 19/093,407

(22) Filed: Mar. 28, 2025

(65) Prior Publication Data

US 2025/0221392 A1 Jul. 10, 2025

Related U.S. Application Data

(62) Division of application No. 18/064,697, filed on Dec. 12, 2022, now Pat. No. 12,262,702.

(60) Provisional application No. 63/288,914, filed on Dec. 13, 2021.

(51) Int. Cl.
*A01K 97/08* (2006.01)
*B60R 9/048* (2006.01)

(52) U.S. Cl.
CPC .............. *A01K 97/08* (2013.01); *B60R 9/048* (2013.01)

(58) Field of Classification Search
CPC ................................ A01K 97/08; B60R 9/048
See application file for complete search history.

(56) References Cited

U.S. PATENT DOCUMENTS

| | | | | |
|---|---|---|---|---|
| 5,341,590 | A | 8/1994 | Hepworth et al. | |
| 5,896,849 | A | 4/1999 | Branthwaite et al. | |
| 6,364,150 | B1 | 4/2002 | Persinger | |
| 8,783,748 | B1 | 7/2014 | Quinn | |
| 10,375,944 | B2 * | 8/2019 | Smigaj | B60R 9/08 |
| 10,486,612 | B2 | 11/2019 | McCoy et al. | |
| D887,134 | S | 6/2020 | Strand et al. | |
| D891,768 | S * | 8/2020 | McGowan | D3/260 |
| D946,277 | S * | 3/2022 | McGowan | D3/260 |
| 2015/0327530 | A1 | 11/2015 | Langley | |
| 2019/0110456 | A1 | 4/2019 | Smigaj et al. | |
| 2019/0230911 | A1 * | 8/2019 | Smigaj | A45F 5/00 |
| 2020/0238918 | A1 * | 7/2020 | Kuschmeader | B60R 9/08 |
| 2020/0307464 | A1 * | 10/2020 | McFadden | A01K 97/10 |
| 2021/0114528 | A1 * | 4/2021 | Nevener | B60R 9/048 |
| 2021/0378223 | A1 | 12/2021 | Iverson | |

* cited by examiner

*Primary Examiner* — Richard G Davis

(74) *Attorney, Agent, or Firm* — Sterne, Kessler, Goldstein & Fox P.L.L.C.

(57) ABSTRACT

Fishing equipment carriers include a rod housing and a support coupled to the rod housing. The support defines an aperture configured to receive a fishing rod therethrough.

20 Claims, 15 Drawing Sheets

FISHING EQUIPMENT CARRIER

CROSS REFERENCE TO RELATED APPLICATIONS

This application is a divisional of U.S. application Ser. No. 18/064,697, filed Dec. 12, 2022, which claims priority to U.S. provisional application No. 63/288,914 filed Dec. 13, 2021, the contents of which are hereby incorporated by reference in their entirety.

BACKGROUND

Field

The present disclosure relates to fishing equipment carriers. In particular, embodiments relate to vehicle-mounted fishing equipment carriers for storing and transporting fishing equipment.

Background

Vehicle-mounted equipment carriers can be used to store and transport items during travel. Some vehicle-mounted equipment carriers can be used to store and transport sporting equipment, such as fishing rods and reels. Various mechanisms can be used to secure and protect the fishing rods and reels during transportation. However, these devices can be cumbersome, fail to securely fasten the fishing rods or reels to the equipment carrier, or apply additional force or abrasion to the fishing rod during transportation.

BRIEF SUMMARY

In some embodiments, a fishing equipment carrier can be used for the storage and transportation of fishing equipment. In some embodiments, a fishing equipment carrier includes a rod housing and a support coupled to the rod housing. In some embodiments, the support defines an aperture configured to receive a fishing rod therethrough.

In some embodiments, the support includes a plurality of bristles. In some embodiments, the support is coupled to and extends from an interior surface of the rod housing.

In some embodiments, the fishing equipment carrier includes a rod centering holder. In some embodiments, the rod centering holder includes a first portion and a second portion. In some embodiments, the rod centering holder is disposed between the first portion and the second portion of the rod housing. In some embodiments, the support is disposed within an interior of the rod centering holder. In some embodiments, the aperture defined by the support is annular.

In some embodiments a fishing equipment carrier includes a rod housing having a first portion, a second portion, and a coupling portion. In some embodiments, the first portion includes a first slot, the second portion includes a second slot, and the coupling portion includes a third slot. In some embodiments, at least a portion of the first slot, the second slot, and the third slot are longitudinally aligned.

In some embodiments, the first portion and the second portion of the rod housing are extruded members. In some embodiments, the third slot is wider than the first slot and the second slot. In some embodiments, the fishing equipment carrier includes a mounting foot configured to be coupled to the rod housing and slidably disposed within the first slot and the second slot.

In some embodiments, a fishing equipment carrier includes a rod housing and a reel housing coupled to the rod housing. In some embodiments, the reel housing includes a base portion, a funnel portion coupled to the base portion and rod housing, and a lid coupled to the funnel portion. In some embodiments, the lid is configured to rotate between an open position allowing insertion of a fishing rod into the rod housing through the reel housing, and a closed position configured to enclose a fishing reel within the reel housing.

In some embodiments, the interior of the funnel portion is curved. In some embodiments, the funnel portion is integral with the base portion.

In some embodiments, a fishing equipment carrier includes a reel housing, a base portion, and a rod stopper disposed in the reel housing. In some embodiments, the rod stopper includes an upright portion configured to engage a fishing rod to limit longitudinal displacement of the fishing rod.

In some embodiments, the base portion is integral with the reel housing.

In some embodiments, the rod stopper is slidably disposed within a slot in the base portion. In some embodiments, the rod stopper is rotatable within the slot. In some embodiments, the rod stopper is configured to abut a rod handle of the fishing rod.

In some embodiments, the base portion includes a slot and a track disposed adjacent the slot. In some embodiments, the track includes a plurality of notches.

In some embodiments, the rod stopper includes a base and a slot engaging member disposed under the base. In some embodiments, the base portion includes a center section and first and second outer sections on opposing sides of the center section. In some embodiments, the outer sections each include an adjustment tab and a locking member.

In some embodiments, the slot engaging member includes a stem and a flange coupled to the stem. In some embodiments, the stem is disposed within the slot of the base portion and the flange is disposed under the slot. In some embodiments, the flange is a disc. In some embodiments, the adjustment tabs are configured to be compressed to disengage the locking members to reposition the rod stopper along the slot.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Figure 1:
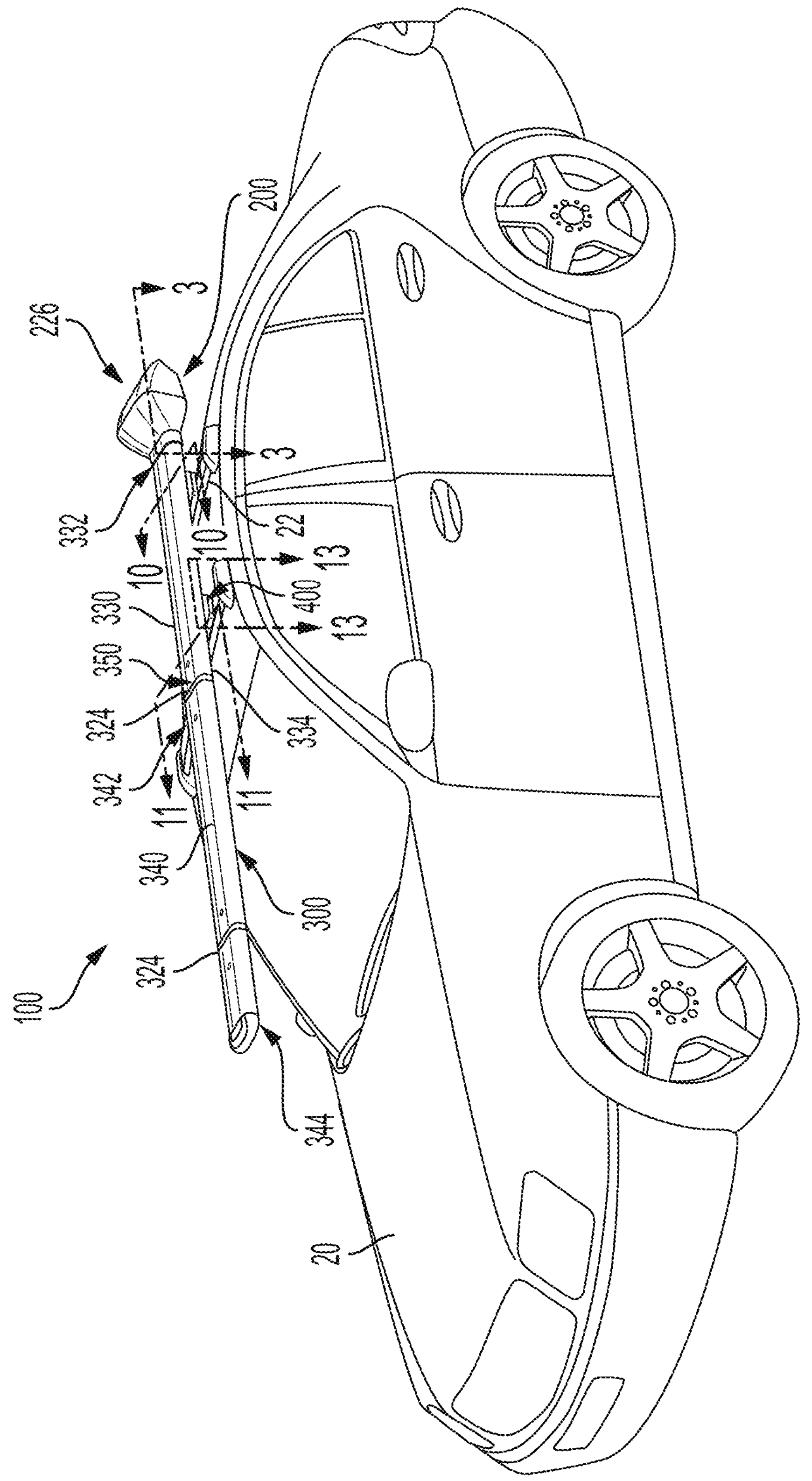
FIG. 1 is a perspective view of a fishing equipment carrier according to an embodiment.
Figure 2:
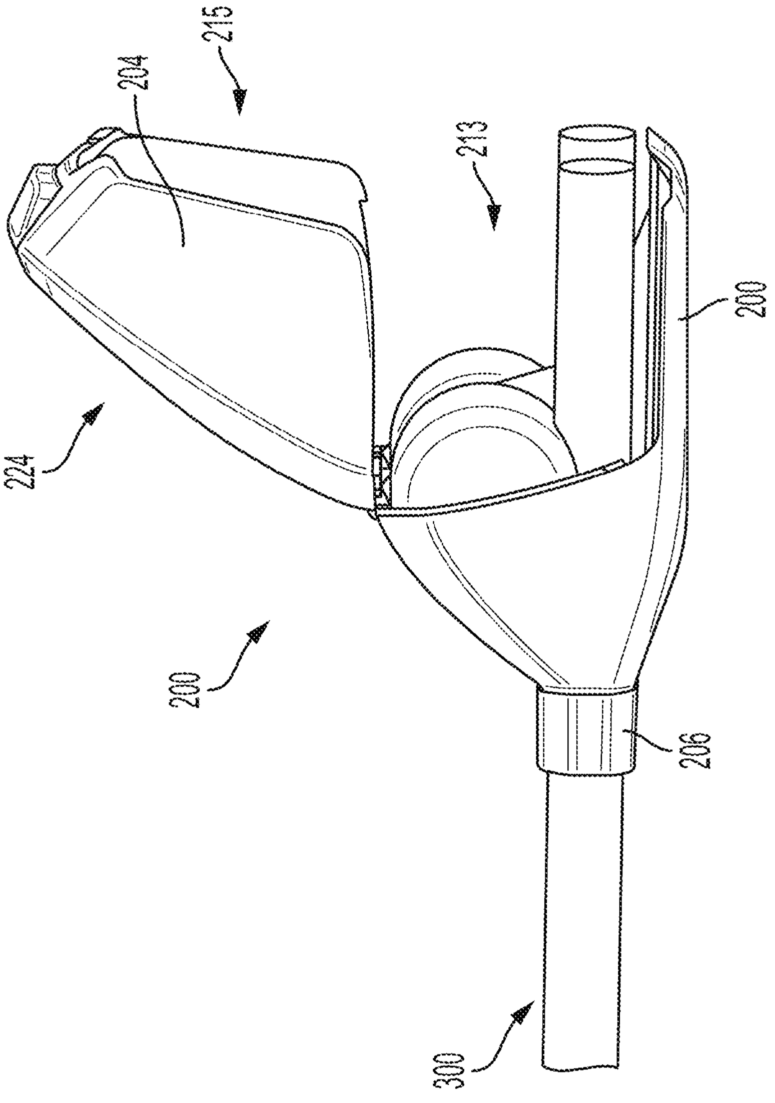
FIG. 2 is a side view of a fishing equipment carrier according to an embodiment.

The features and advantages of the embodiments will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

Vehicle-mounted equipment carriers can be used to store and transport items such as, for example, sporting equipment during travel. Equipment used with vehicle-mounted equipment carriers can be, for example, too large to fit inside the vehicle, or can have other characteristics (e.g., regularly being dirty or wet) that would make storing or transporting the equipment within the vehicle difficult, inconvenient, or unpleasant for the user. Some vehicle-mounted equipment carriers are mounted on the roof of the vehicle, for example, which can offer secure transport of items without obstructing the field of vision of the driver. However, some roof-mounted equipment carriers can damage the equipment during transportation due the equipment sliding around within the carrier. Additionally, the equipment can be damaged when loading the equipment into the carrier.

Some fishing equipment carriers can include a reel housing and a rod housing to store the fishing equipment during transportation. However, the transition point between the rod housing and reel housing is typically a sharp angle which can damage the fishing line. Additionally, when loading a rod into a fishing equipment carrier and transporting the rod, the rod can be scratched and scuffed against the inside of the rod housing. Thus, by making the fishing equipment carrier easier to load and providing greater protection to the rod and reel, the condition of the equipment within the equipment carrier can be preserved.

Embodiments of the present disclosure provide fishing equipment carriers that provide improved protection to the equipment during storage and transportation. Embodiments are configured to store and transport various kinds of fishing equipment such as, for example, fishing rods and fishing reels. The fishing equipment carriers can include, for example, a rod stopper and/or a rod centering holder that secures the equipment in a manner that reduces movement and vibration of the equipment, thereby reducing potential damage to the equipment during transport.

Fishing equipment carriers as described herein can include a reel housing, a rod housing, and/or one or more mounting feet for securing the carrier. In some embodiments, the fishing equipment carrier can be disposed on a roof of a vehicle. In some embodiments, the reel housing and rod housing are coupled to one another and the mounting feet are coupled to the rod housing and secure the fishing equipment carrier to a roof of a vehicle.

A reel housing described herein can include a base portion defining a first compartment and a lid portion defining a second compartment, where the lid portion can be moved between an open position and a closed position. The first compartment can include a fishing line funnel to safely guide a fishing rod through the reel housing without damaging the fishing rod (e.g., the fishing line). A rod stopper can be disposed in the base portion of the reel housing and can be configured to secure the fishing rod disposed in or extending through the reel housing. The rod stopper can be movable between a first position and a second position, for example, by sliding the rod stopper along a track disposed on the base portion of the reel housing. The rod stopper can be rotated into an open position by rotating the rod stopper within the track to create or enlarge an opening configured to receive a fishing rod. In some embodiments, the rod stopper device can be moved from the first position to the second position or the open position using only one hand, thereby making loading and unloading easier for a user. The rod stopper provides sufficient force to the fishing rod to prevent the fishing rod from moving and/or vibrating significantly during transport.

A rod housing described herein can include, for example, an extruded first portion, extruded second portion, and a rod centering holder. The cross-section of the rod housing is configured to house a plurality of rod holders on the outer passages of the rod housing and a T-track in the center section. In some embodiments, a rod centering holder is disposed within each of the extruded portions and can include a plurality of bristles to elevate a fishing rod off of an interior surface of the rod holder to prevent the fishing rod from moving and/or vibrating significantly during transport. A mounting foot described herein can include a mounting portion, lockable feet, and/or a fastening mechanism. The mounting portion of the mounting foot can engage, for example, a T-track of the rod housing, to secure the mounting foot to the rod housing. The lockable foot can secure fishing equipment carrier to a roof of a vehicle. The fastening mechanism can be adjusted to secure the fishing equipment carrier to the roof of a vehicle, or loosened to remove the fishing equipment carrier from the roof of a vehicle.

Embodiments will now be described in more detail with reference to the figures. With reference to FIGS. 1-4, for example, a fishing equipment carrier 100 can include a reel housing 200, a rod housing 300, and a plurality of mounting feet 400 and can be configured to store, secure, and/or transport a fishing rod 5 having a fishing feel 10 and handle 12.

In some embodiments, fishing equipment carrier 100 is configured to be disposed on a vehicle 20. Vehicle 20 can be, for example, a car, truck, van, sport utility vehicle, off-road vehicle, recreational vehicle, camper, trailer, boat, or other passenger or non-passenger vehicle. In some embodiments, fishing equipment carrier 100 is disposed on the roof of vehicle 20 (see, e.g., FIG. 1). In some embodiments, fishing equipment carrier 100 is disposed on the side, rear, or other portion of vehicle 20. In some embodiments, fishing equipment carrier 100 is configured to be mounted on a vehicle roof rack 22 such as, for example, a car rack, truck rack, or roof rack. In some embodiments, fishing equipment carrier 100 is indirectly attached to vehicle 20.

With reference to FIGS. 1-4, for example, reel housing 200 can include a base portion 202 defining a first compartment 213, a lid portion 204 defining a second compartment 215, and a connection member 206 (e.g., a neck portion) to couple the reel housing 200 to the rod housing 300. The lid portion 204 can be moved between an open position 224 (shown in FIG. 2) and a closed position 226 (shown in FIG. 1), for example, using hinge 208. In some embodiments, reel housing 200 can include lock 216 to prevent unwanted access to the reel housing 200 or to prevent reel housing 200 from opening during transport.

In some embodiments, the first compartment 213 can include a fishing line funnel 212 to safely guide fishing rod 5 through the reel housing 200 without damaging the fishing rod. Fishing line funnel 212 can include a rounded interior surface 214 to guide fishing rod 4 through connection member 206, without applying excessive force to the fishing line. In some embodiments, fishing line funnel 212 does not include sharp angles on the interior surface 214, which can prevent fishing line from kinking or breaking. In some embodiments, fishing line funnel 212 can include padding on the interior surface 214 to provide additional cushion and support to the first compartment 213 to prevent damage to the fishing rod 5.

Figure 3:
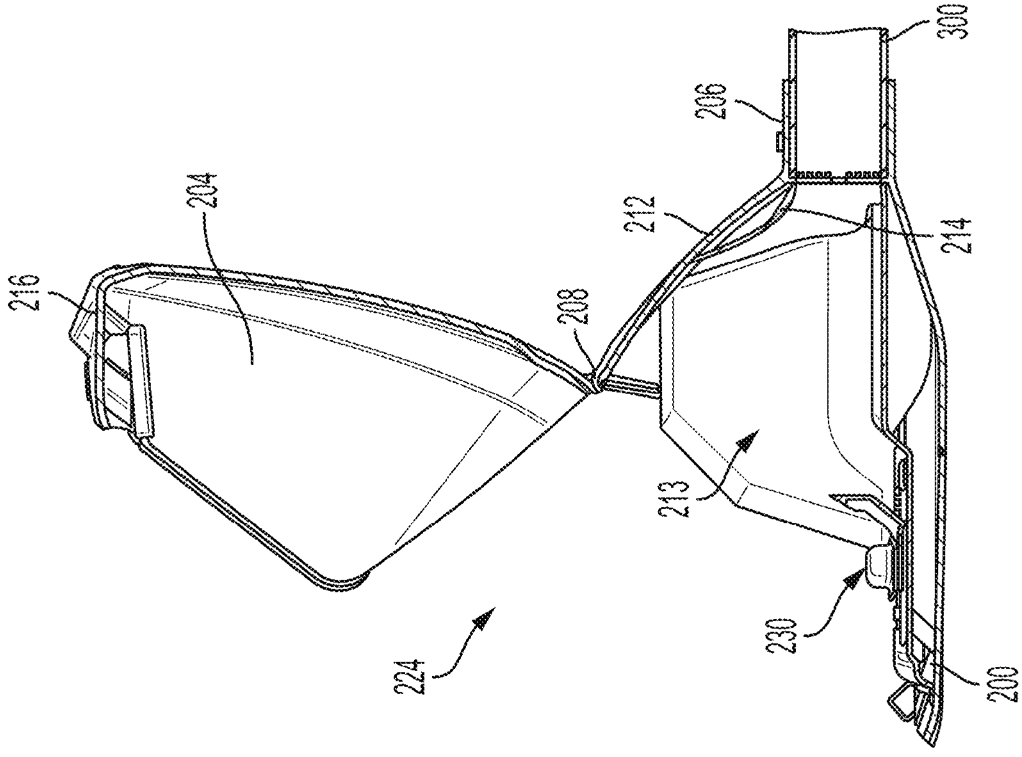
FIG. 3 is a cross-sectional view of the fishing equipment carrier of FIG. 1 along line 3-3.
Figure 4:
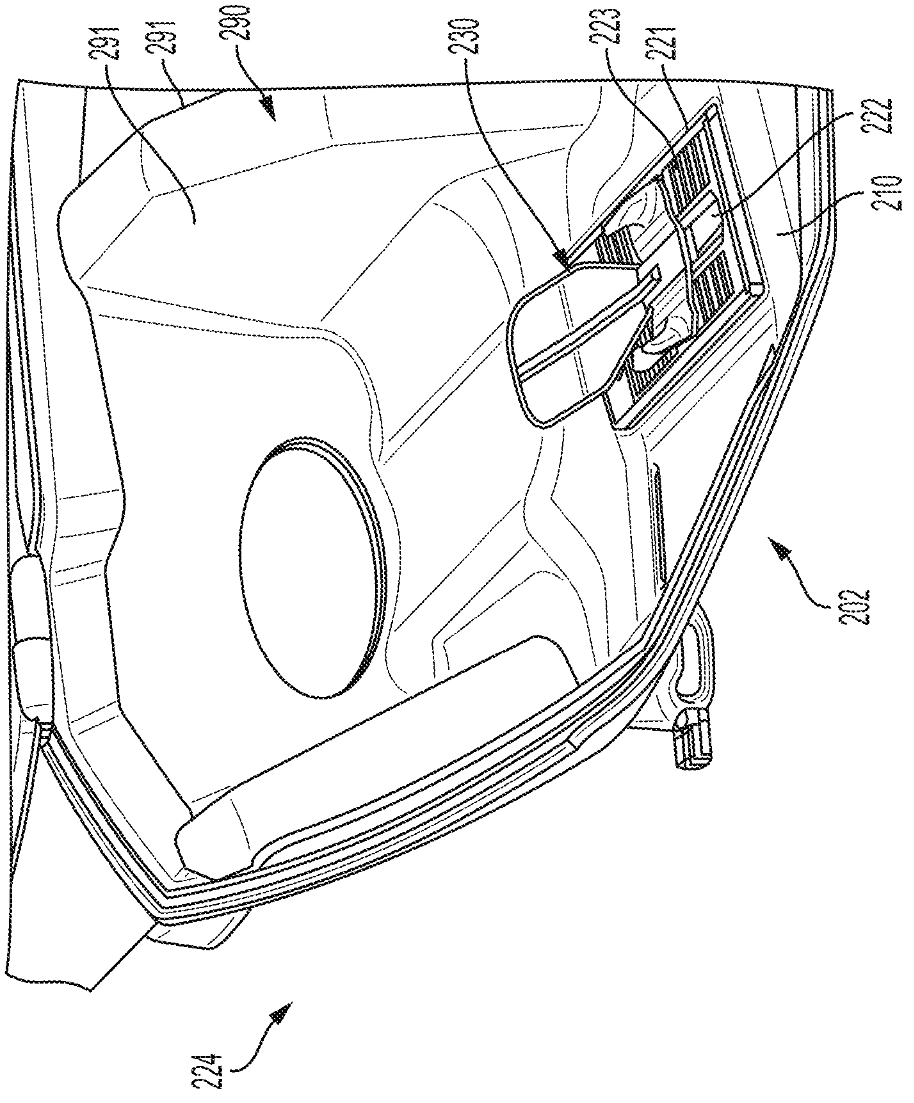
FIG. 4 is a perspective view of a portion of a fishing equipment carrier according to an embodiment.

As shown, for example in FIGS. 3-4, the base portion 202 can include a floor 210 to which a rod stopper 230 is coupled. Floor 210 can include one or more tracks 221 which can have a groove or slot 222 and a plurality of notches 223 disposed alongside the slot 222. In some embodiments, notches 223 are raised relative to the floor 210. In some embodiments, notches 223 are depressions in floor 210. In some embodiments, one or more tracks 221 are spaced apart transversely in the first compartment 213, as shown for example in FIGS. 7-8. In some embodiments, reel housing further includes a divider 290 to prevent multiple fishing rods 5 from contacting one another while in the reel housing 200. In some embodiments, divider 290 can include padding on one or both interior surfaces 291 to provide additional support and protection to fishing rods 5 during transport.

In some embodiments, a rod stopper 230 can be disposed in the track 221 of the base portion 202 and can be configured to secure the fishing rod 5 disposed in or extending through the reel housing 200 (e.g., by pressing against the handle 12 of fishing rod 5). Rod stopper 230 can be made from a variety of materials, for example, but not limited to plastic, metal, a composite material, or combination thereof. The rod stopper 230 can be movable between a first position 260 and a second position 270 by sliding the rod stopper 230 along the track 221. In some embodiments, the rod stopper 230 can be rotated into a rotated position 280 by rotating the rod stopper within the track to create or enlarge an opening configured to receive a fishing rod 5 (or portion of the rod, e.g., the handle 12). In some embodiments, the rod stopper 230 can be moved from the first position to the second position or the open position using only one hand, thereby making loading and unloading easier for a user. The rod stopper 230 provides sufficient force (e.g., to the handle 12 of fishing rod 5) to prevent the fishing rod 5 from moving and/or vibrating significantly during transport.

Figure 5:
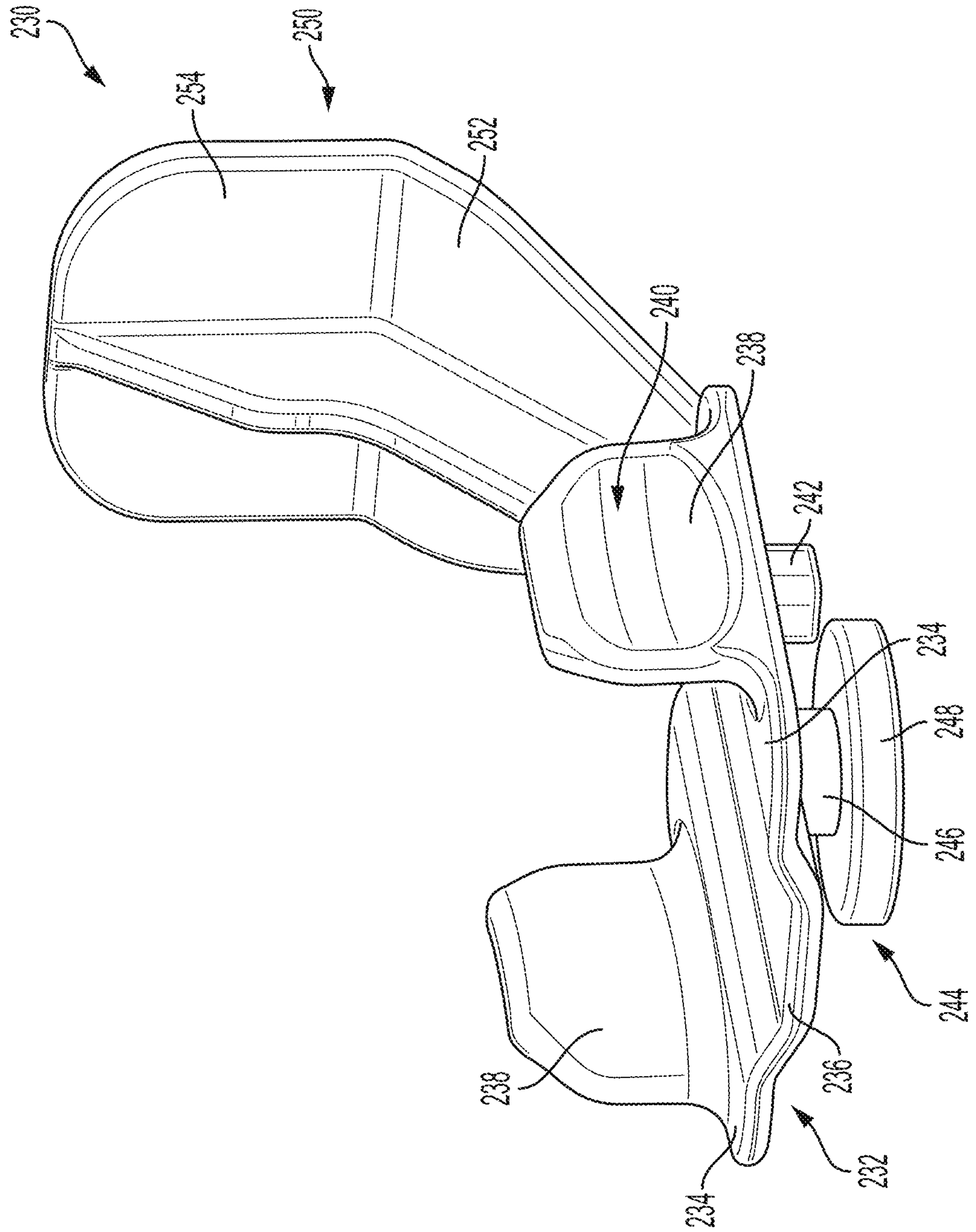
FIG. 5 is a perspective view of a rod stopper according to an embodiment.

As shown, for example in FIG. 5, rod stopper 230 can include base 232, adjustment tabs 238, locking member 242, slot engaging member 244, and/or compression member 250. Base 232 can include outer sections 234 on opposing sides of center section 236.

In some embodiments, rod stopper 230 can be disposed on an interior of reel housing 200 other than base 202, for example, on divider 290. For example, in some embodiments, divider 290 can include track 221 and rod stopper 230 can be positioned perpendicular to divider 290 and can be coupled along track 221 to apply force directly to reel 10.

In some embodiments, adjustment tabs 238 extend from the outer sections 234 and can include a concave portion 240 for ergonomic handling of the adjustment tabs 238. Adjustment tabs 238 help to position the rod stopper 230 along track 221. For example, in some embodiments, a user can compress one or both adjustment tabs 238 to move the rod stopper 230 from the first position 260 to the second position 270 along track 221. The compression of the adjustment tabs 238 causes outer sections 234 to raised relative to the center section 236, thus disengaging locking members 242 from the notches 223 so that rod stopper 230 can move (e.g., translate and/or rotate) within slot 222. In this configuration, rod stopper 230 can slide freely along track 221 to a desired position, for example, the second position. The user can then release the adjustment tabs 238, which returns outer sections 234 to their initial positions, allowing locking members 242 to engage notches 223 to secure rod stopper 230 in place.

In some embodiments, locking members 242 (e.g., protrusion, projection, pin, etc.) extend from the outer sections 234, for example, opposite from the adjustment tabs 238. Locking members 242 can be configured to engage the plurality of notches 223 on the floor 210 of the reel housing. For example, in some embodiments, locking members 242 extend in between notches 223 and prevent rod stopper 230 from sliding between the first position to the second position. In some embodiments, locking members can nest within notches 223 to create an interference lock.

In some embodiments, slot engaging member 244 can extend from the center section 236 of rod stopper 230 in the same direction (e.g., downward) as the locking members 242, and be configured to engage track 221 of reel housing 200. For example, slot engaging member 244 can include shaft 246 and flange 248 extending from shaft 246 and disposed within slot 222. In some embodiments, flange 248 is sized larger than slot 222 and shaft 246 such that rod stopper 230 is secured to track 221 and cannot be removed once installed. In some embodiments, flange 248 has a circular, square, or triangular shape. In some embodiments, flange 248 has a disc shape such that flange 248 can rotate within track 221.

In some embodiments, compression member 250 can extend from base 232 and be configured to secure a handle 12 of fishing rod 5 in place, for example, during transport. In some embodiments, compression member 250 includes an angled member 252 and an upright member 254. Angled member 252 can be configured such that the compression member 250 extends longitudinally away from base 232 at an angle toward fishing rod 5. Angled member 252 is configured to provide stability while distributing and withstanding compressive force to and from fishing rod 5 without allowing rod stopper 230 to slide out of the first position 260. Upright member 254 is configured to engage handle 12 of fishing rod 5. In some embodiments, upright member 254 has a flat surface to maximize the surface area contacting handle 12. In some embodiments, compression member 250 includes only one of angled member 252 and upright member 254.

Figure 6:
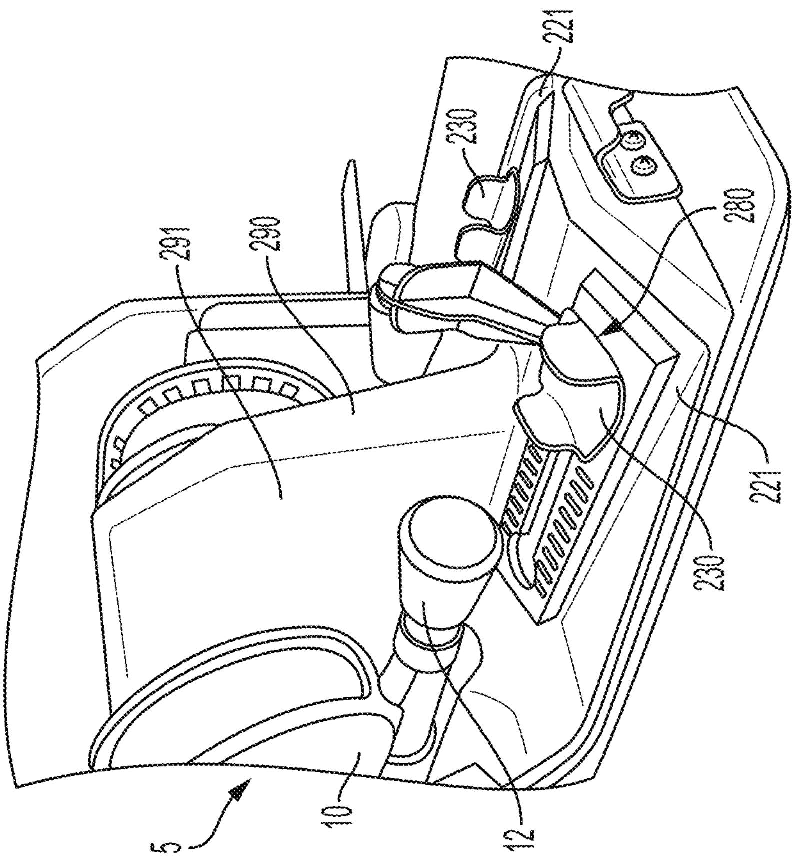
FIG. 6 is a perspective view of a portion of a fishing equipment carrier according to an embodiment.
Figure 7:
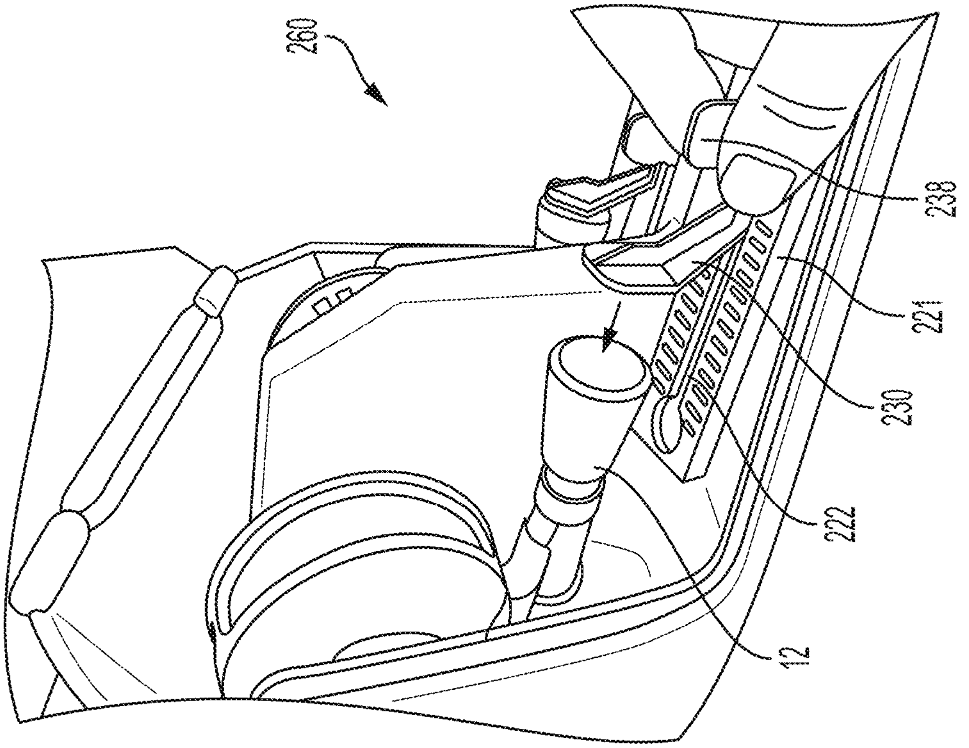
FIG. 7 is a perspective view of a portion of a fishing equipment carrier according to an embodiment.
Figure 8:
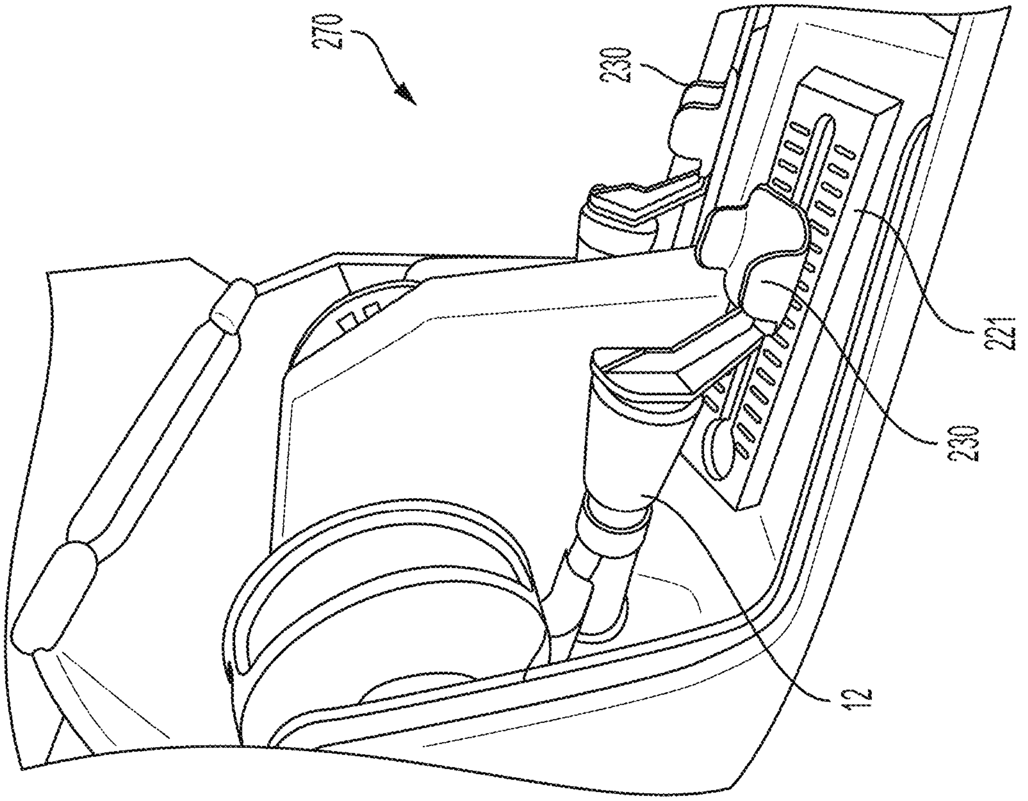
FIG. 8 is a perspective view of a portion of a fishing equipment carrier according to an embodiment.

As shown, for example in FIGS. 6-8, rod stopper 230 can be positioned within track 221. As shown in FIG. 6, rod stopper 230 can be in a rotated position 280 such that fishing rod 5 can be inserted through reel housing 200 without obstruction from rod stopper 230. As shown, fishing rod 5 is inserted in the upright position such that fishing reel 10 is upright. A user can then rotate rod stopper 230 to the first position 260 as shown, for example, in FIG. 7. In the first position 260, the compression member 250 is facing and aligned with handle 12 of fishing rod 5, and locking member 242 engages one of the plurality of notches 223 on track 221. A user can slide rod stopper 230 along track 221 to the second position 270 (e.g., where locking member 242 is disposed in one of the other notches on track 221), for example, by compressing the adjustment tabs 238. Upon compressing the adjustment tabs 238, the outer sections 234 can lift up and disengage the locking member 242 from the notches 223. Rod stopper 230 can then be positioned along track 221 until angled member 252 engages handle 12 of fishing rod 5. Adjustment tabs 238 can then be released, and rod stopped 230 such that in the second position 270, as shown, for example, in FIG. 8. Depending on the length of handle 12 of fishing rod 5, rod stopper 230 can be positioned at any one of the plurality of notches 223 that position the angled member 252 against handle 12 of the fishing rod 5. To release the rod stopper 230 from the fishing rod, a user can, for example compress adjustment tabs 238 to disengage locking member 242 from track 221 and slide rod stopper 230 away from fishing rod 5. Rod stopper 230 can also be rotated to the rotated position 280 to allow for easy removal of fishing rod 5.

In some embodiments, rod stopper 230 can be removably adjusted along track 221. For example, in some embodiments, track 221 does not include slot 222, and instead includes a plurality depressions or holes within which slot engaging member 244 and/or locking member(s) 242 are secured. In some embodiments, slot engaging member 244 of rod stopper 230 can include a peg or plurality of pegs configured to engage one or more of the plurality of depressions to secure rod stopper 230 in a desired position. To reposition rod stopper 230 along track 221, a user can disengage slot engaging member 244 from the depression(s), for example by pulling it out of the depression(s), and place rod stopper 230 in a different depression along track 221.

With reference to FIGS. 1 and 9-11, for example, rod housing 300 can include a first portion 330, second portion 340, and/or rod centering holders 313 disposed within the rod housing 300.

In some embodiments, first portion 330 can include a first end 332 that is open and coupled to connection member 206 of reel housing 200. In some embodiments, a second end 334 of first portion 330 engages coupling section 324. In some embodiments, coupling section 324 couples second end 334 of first portion 330 to a first end 342 of second portion 340. Second end 344 of second portion 340 is closed to enclose the fishing rod 5. In some embodiments, rod housing 300 can include a plurality of coupling sections 324, and a plurality of portions 330, 340. As such, the length of rod housing 300 can be adjusted accordingly, depending on the length of the fishing rod which is being stored.

Figure 9:
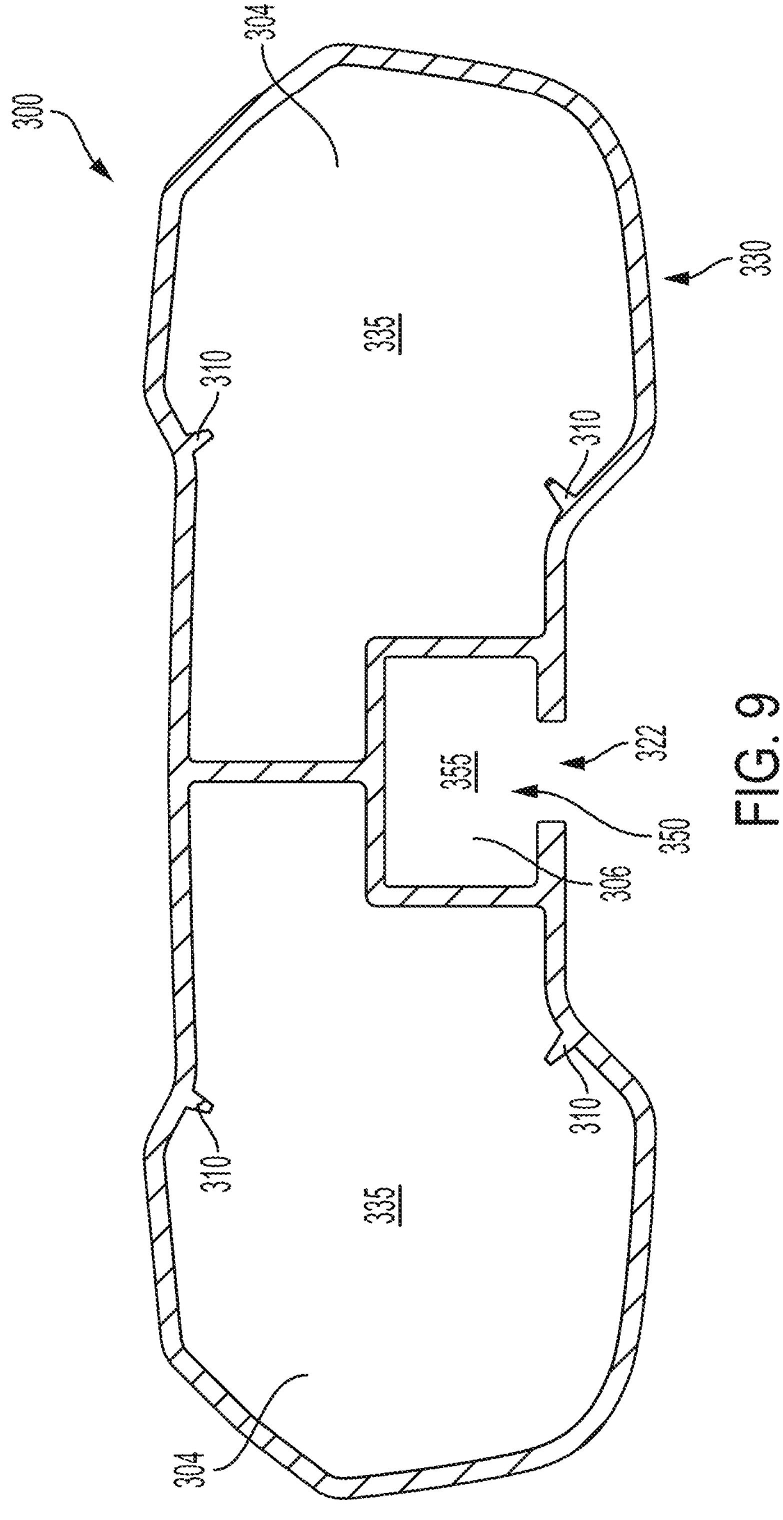
FIG. 9 is a cross-sectional view of a rod holder according to an embodiment.
Figure 10:
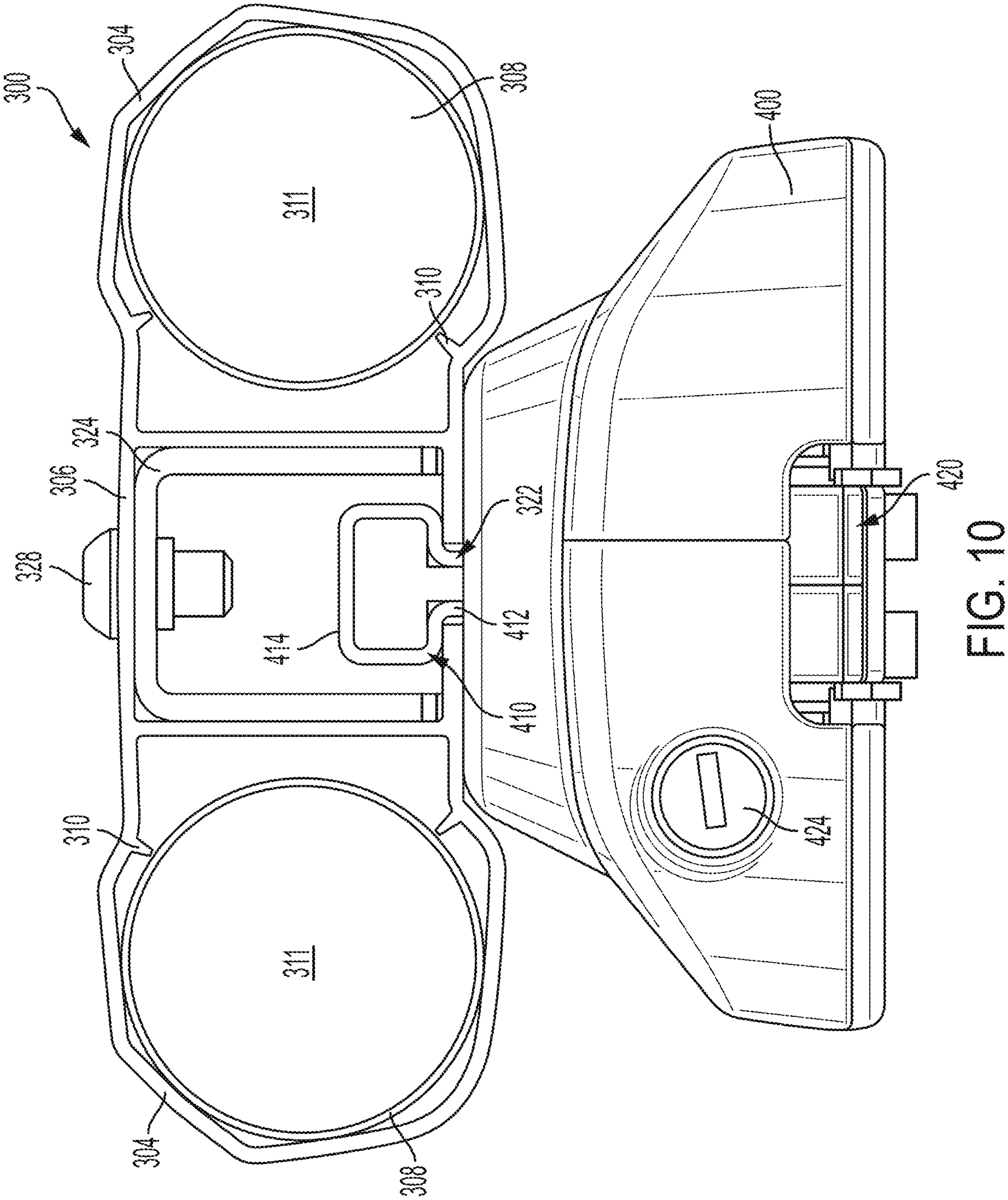
FIG. 10 is a cross-sectional view of the fishing equipment of FIG. 1 along line 10-10.

FIGS. 9-10 show, for example, cross-sectional views of the rod housing 300. In some embodiments, rod housing 300 includes outer passages 304 and center passage 306 disposed between outer passages 304.

Outer passages 304 are configured to house one or more rod holders 308, such that each rod holder can enclose and protect a fishing rod 5. Outer passages 304 can each include one or more protrusions 310 for securing a rod holder 308 in place within the outer passages 304.

In some embodiments, center passage 306 is configured to engage a roof rack of a vehicle 20. Center passage 306 can include a mounting slot 322 for a mounting foot 400 to slidably engage the rod housing 300. In some embodiments, as shown for example in FIG. 10, center passage 306 can include a plurality of apertures 326 for coupling the first portion 330 of rod housing 300 to second portion 340 of rod housing 300. For example, in some embodiments, second end 334 (as shown in FIG. 1) can have a greater diameter than first end 342 such that apertures 326 of both the first portion 330 and second portion 340 align. Fasteners 328 can extend through apertures 326 to secure first portion 330 to second portion 340. In some embodiments, first end 342 can have a greater diameter than second end 334 such that second end 334 can nest within first end 342 such that apertures 326 align.

Figure 11:
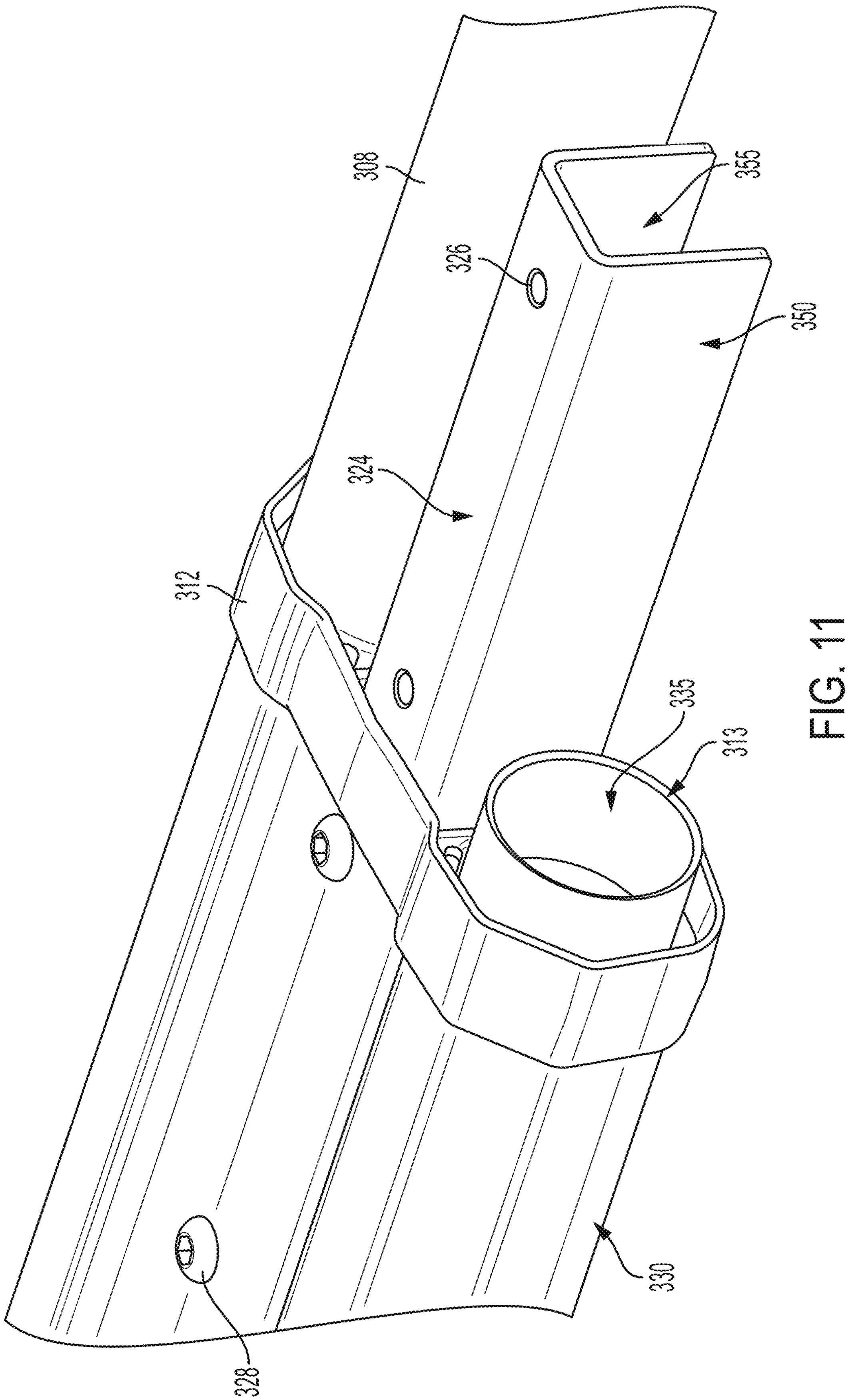
FIG. 11 is a perspective view of the fishing equipment of FIG. 1 along line 11-11.
Figure 15:
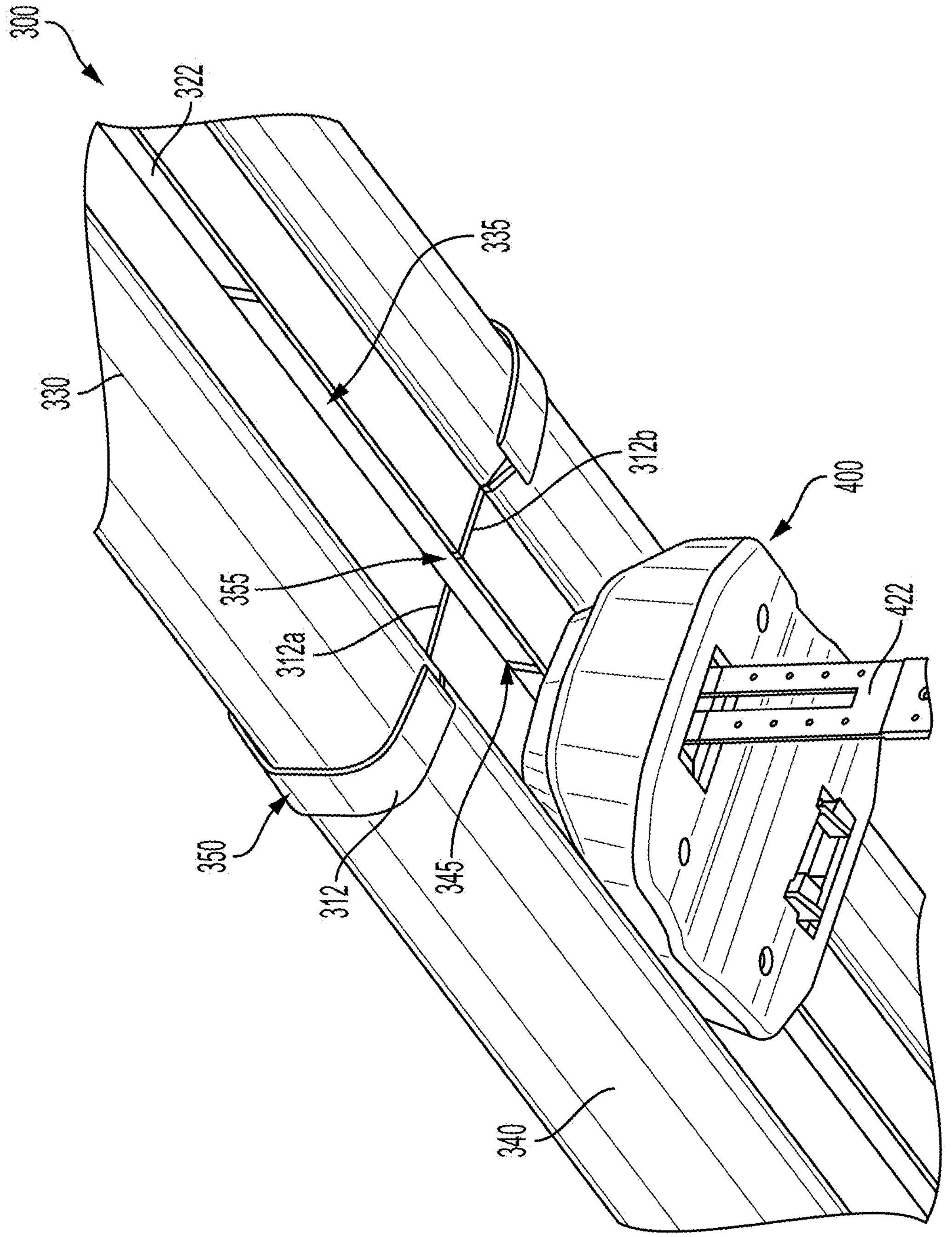
FIG. 15 is a perspective view of the underside of the fishing equipment of FIG. 1.

In some embodiments, as shown for example in FIG. 11, rod housing 300 can include a coupling section 324 disposed between first portion 330 and second portion 340. Coupling section can have a width smaller than center passage 306 such that coupling section 324 can nest within both portions 330, 340 to couple the first portion 330 to the second portion 340. In some embodiments, coupling section does not overlap or interfere with mounting slot 322 such that once coupled, the mounting slot 322 is continuous from the first portion 330 to second portion 340 (as shown in FIG. 15).

Figure 12:
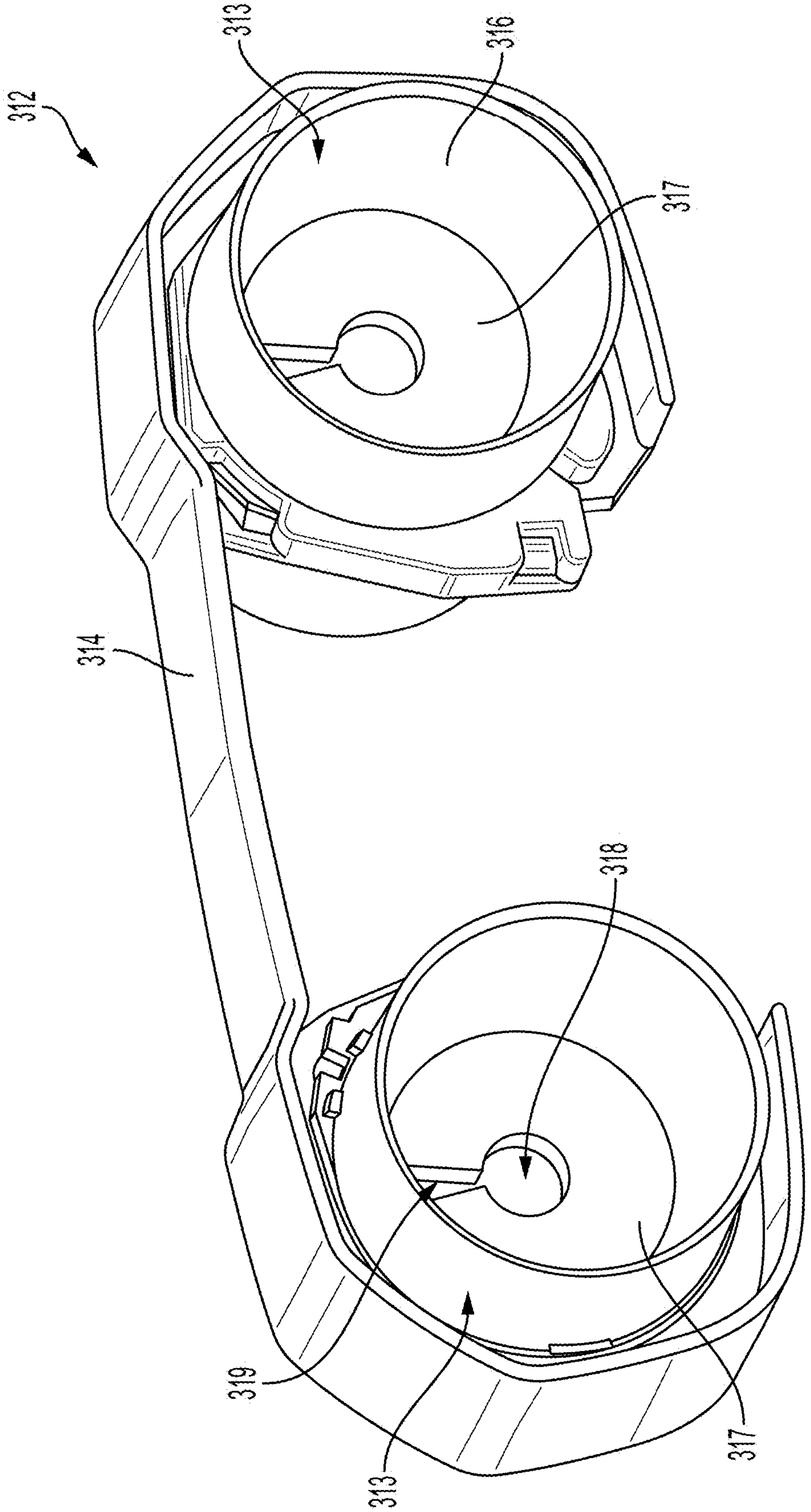
FIG. 12 is a perspective view of a rod centering holder according to an embodiment.

In some embodiments, as shown for example in FIGS. 11-12, rod housing 300 can include a centering holder insert 312. Centering holder insert 312 includes one or more rod centering holders 313 that are configured to prevent the fishing rod 5 from contacting the interior surface 311 (shown in FIG. 10) of rod holder 308 during transport. This configuration protects fishing rod 5 from being damaged through vibrations and abrasion during transport and insertion into rod housing 300.

In some embodiments, centering holder insert 312 includes a securement section 314 configured to couple rod centering holders 313 to rod holders 308. In some embodiments, centering holder insert 312 does not have a closed geometric shape such that mounting slot 322 (shown in FIG. 15) is unobstructed. For example, in some embodiments, rod housing 300 includes a first portion 330 having a first slot 335, a second portion 340 having a second slot 345, and a coupling portion 350 having a third slot 355. In some embodiments, the coupling portion is the centering holder insert 312 (e.g., the third slot 355 is a gap between ends 312*a*, 312*b* of centering holder insert 312). In some embodiments, the first slot 335, the second slot 345, and the third slot 355 are longitudinally aligned. In some embodiments, the first slot 335 and the second slot 345 have equal widths. In some embodiments, the third slot 355 (e.g., gap in centering holder insert 312) is wider than the first slot 335 and the second slot 345.

In some embodiments, rod centering holder 313 includes an interior surface 316, and/or a support 317 (e.g., a plurality of bristles, foam, cushion, and/or padding). In some embodiments, securement section 314 is. In some embodiments, interior surface 316 includes a plurality of bristles 317 which extend from interior surface 316 towards the center of rod centering holders 313. In some embodiments, as shown for example in FIG. 12, bristles 317 do not extend fully to the center of rod centering holders 313 and instead define a guide aperture 318. In some embodiments, guide aperture 318 can include a notch 319 disposed in support 317. Fishing rod 5 can be inserted through rod housing 300 and rest on bristles 317 such that fishing rod 5 does not contact interior surface of rod housing 300 and such that fishing rod 5 is supported on all sides from vibrations and abrasion. In some embodiments, a plurality of rod centering holders 313 are disposed within rod holders 308 to provide support and protection to fishing rod 5 along its length.

In some embodiments, rod centering holders 313 are integral to rod housing 300. In some embodiments, rod centering holders have a circular shape (as shown in FIGS.

Figure 13:
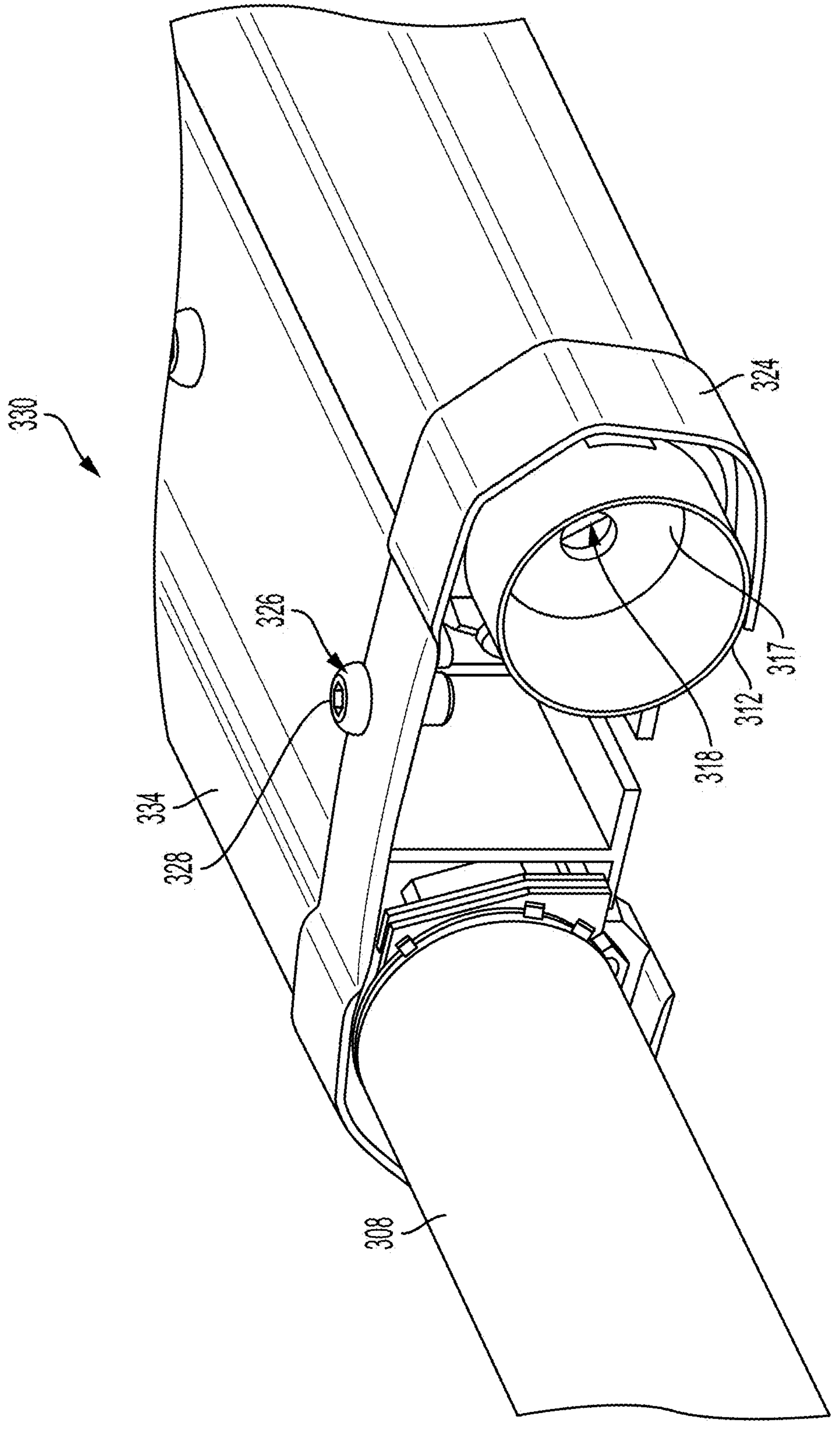
FIG. 13 is a perspective view of the fishing equipment of FIG. 1 along line 11-11.

10-13). In some embodiments, rod centering holders can have a square, triangular, rectangular, or polygonal shape. In some embodiments, rod centering holders 313 have a closed geometric shape (as shown, for example, in FIG. 13). In some embodiments, rod centering holders 313 can have the same shape as outer passages 304. In some embodiments, each rod holder 308 includes one or more rod centering holders 313 disposed at multiple locations along its length.

Figure 14:
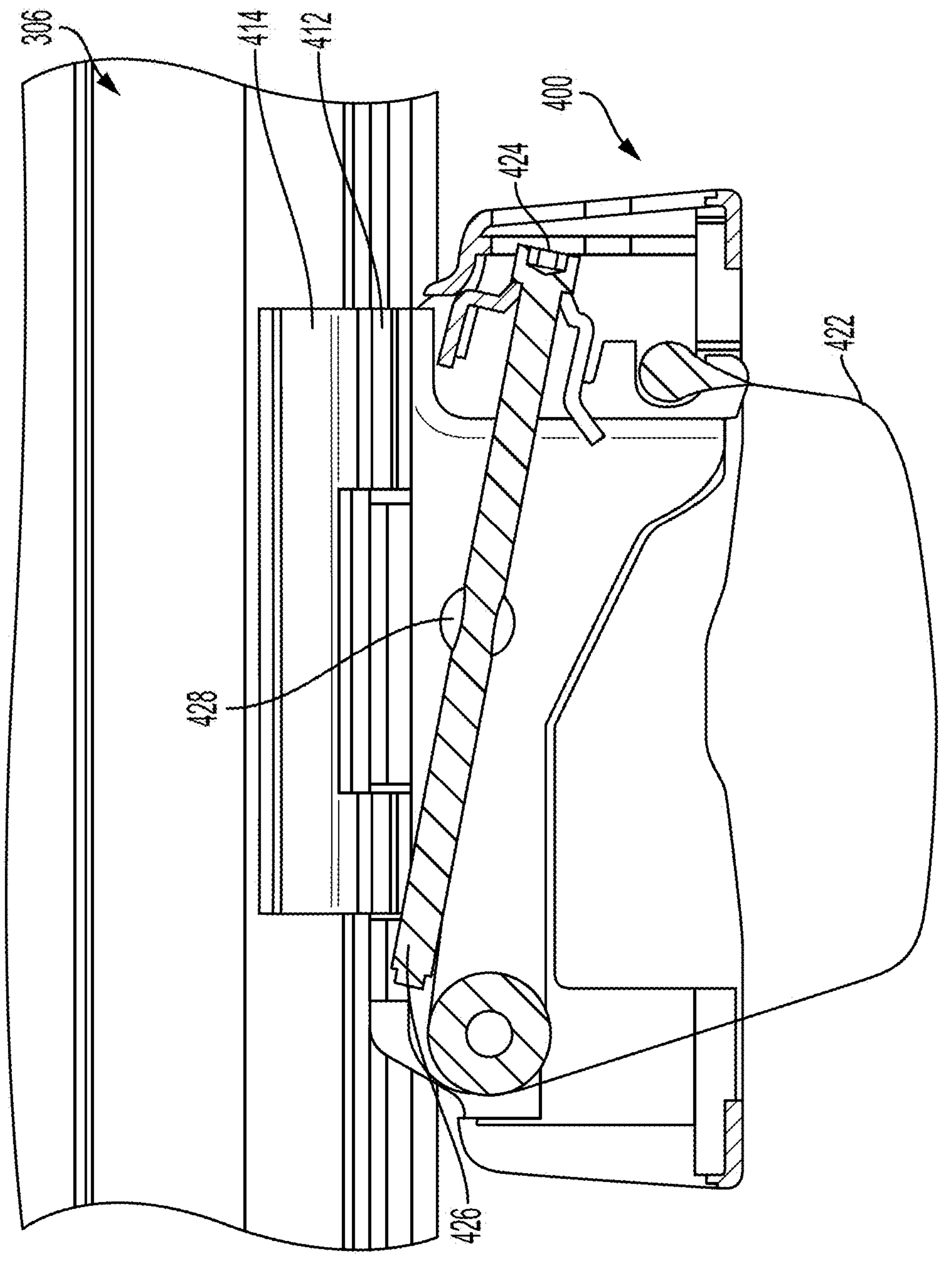
FIG. 14 is a cross-sectional view of the fishing equipment of FIG. 1 along line 13-13.

With reference to FIGS. 10 and 14, for example, in some embodiments, mounting feet 400 are configured to secure rod housing 300 to a roof of a vehicle. In some embodiments, mounting feet 400 can include a mounting portion 410 and roof engaging portion 420. In some embodiments, as shown in FIG. 10, mounting portion 410 engages mounting slot 322 of rod housing 300, to secure mounting feet 400 to rod housing 300. Accordingly, roof engaging portion 420 can engage roof rack of a vehicle 20 to secure fishing equipment carrier 100 to a vehicle 20.

As shown, for example, in FIG. 10, in some embodiments, mounting portion 410 can include a shaft 412 and a flange 414. In some embodiments, flange 414 has a greater width than shaft 412 such that shaft 412 can fit within mounting slot 322 of rod housing 300. Since flange 414 has a greater width than both shaft 412 and mounting slot 322, mounting feet 400 is secured to rod housing 300 and cannot be separated by flange 414 pulling out through mounting slot 322. Mounting feet 400 can slide along mounting slot 322 of rod housing to adjust the positioning of mounting feet 400.

In some embodiments, roof engaging portion 420 can include straps 422 and fastening mechanism 424 to secure fishing equipment carrier 100 to roof rack 22 of a vehicle 20. FIG. 14 shows, for example, a cross-sectional view of a mounting foot 400 within mounting slot 322 of rod housing 300. To secure mounting feet 400 to a roof rack, a user can position straps 422 loosely around roof rack. A user can then engage fastening mechanism 424 to begin tightening straps 422. As fastening mechanism tightens straps 422, the slack decreases until mounting feet 400 is secured to roof rack. In some embodiments, fastening mechanism 424 is a bolt or screw and is tightened through a rotational force. In some embodiments, fastening mechanism 424 is a lock and pin.

As shown, for example in FIG. 14, the fastening mechanism 424 can include a shaft 426, fastening nut 428, and is secured via strap 422 to mounting feet 400. As a user tightens fastening mechanism 424, shaft 426 rotates fastening nut 428 which tightens strap 422 within mounting feet 400. A user can continue to tighten fastening mechanism 424 until strap 422 is taut around the roof rack of a vehicle. In some embodiments, fastening mechanism 424 can be adjusted to secure the fishing equipment carrier to the roof of a vehicle, or loosened to remove the fishing equipment carrier from the roof of a vehicle. As shown for example in FIG. 1, fishing equipment carrier 100 can include one or more mounting feet 400 disposed along the length of the rod housing 300.

As shown, for example in FIG. 15, mounting feet 400 can slide along mounting slot 322 to adjust the positioning the fishing equipment carrier 100 on the roof of a vehicle. As discussed above, mounting feet 400 can slide along mounting slot 322 through the first portion 330 and second portion 340, without interruption from centering holder insert 312.

Embodiments of the present disclosure are described in detail with reference to embodiments thereof as illustrated in the accompanying drawings. References to "one embodiment," "an embodiment," "an exemplary embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The examples herein are illustrative, but not limiting, of the present embodiments. Other suitable modifications and adaptations of the variety of conditions and parameters normally encountered in the field, and which would be apparent to those skilled in the art, are within the spirit and scope of the disclosure.

It is to be appreciated that the Detailed Description section, and not the Summary and Abstract sections, is intended to be used to interpret the claims. The Summary and Abstract sections can set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A fishing equipment carrier comprising:

a rod housing, comprising:

a first portion having a first slot, a second portion having a second slot, and a coupling portion having a third slot, wherein at least a portion of the first slot, the second slot, and the third slot are longitudinally aligned, and wherein the first slot connects with the second slot to form an elongated slot extending from the first portion to the second portion.

2. The fishing equipment carrier of claim 1, wherein the first portion and the second portion of the rod housing are extruded members.

3. The fishing equipment carrier of claim 1, further comprising a mounting foot configured to be coupled to the rod housing and slidably disposed within the first slot and the second slot.

4. The fishing equipment carrier of claim 3, wherein the mounting foot comprises a mounting portion disposed in at least one of the first, second and third slots, and a vehicle engaging portion configured to couple with a roof rack on a vehicle.

5. The fishing equipment carrier of claim 4, wherein the mounting portion comprises a shaft and a flange, and wherein the shaft has a narrower width than the first, second, and third slots, and the flange has a wider width than the first, second, and third slots.

6. The fishing equipment carrier of claim 4, wherein the vehicle engaging portion comprises a strap configured to extend around a vehicle accessory, and a fastening mechanism configured to tighten the strap on the vehicle accessory.

7. The fishing equipment carrier of claim 1, wherein the third slot at least partially overlaps at least one of the first slot and the second slot.

8. The fishing equipment carrier of claim 1, wherein the first slot is disposed between a first rod holder and a second rod holder.

9. The fishing equipment carrier of claim 1, wherein the coupling portion is a centering holder configured to support a fishing rod within a rod holder.

10. The fishing equipment carrier of claim 9, wherein the centering holder extends around the rod holder and comprises a securement section and at least one protrusion extending inward toward the rod holder and configured to secure the rod holder to the centering holder.

11. A fishing equipment carrier comprising:

a rod housing, comprising:

a first portion having a first slot, a second portion having a second slot, and a coupling portion having a third slot, wherein at least a portion of the first slot, the second slot, and the third slot are longitudinally aligned, and wherein the third slot is wider than the first slot and the second slot.

12. The fishing equipment carrier of claim 11, wherein the third slot is formed between a first terminating end and a second terminating end of the coupling portion.

13. A fishing equipment carrier comprising:

a rod housing configured to house a fishing rod within the rod housing, the rod housing comprising a plurality of slots; and a mounting foot configured to couple the rod housing to a vehicle, the mounting foot comprising an attachment member configured to be slidably disposed within at least one of the plurality of slots, wherein the plurality of slots are connected such that the mounting foot slides between adjacent slots of the plurality of slots.

14. The fishing equipment carrier of claim 13, wherein the rod housing comprises a first portion, a second portion, and a coupling portion configured to couple the first portion with the second portion, and wherein the coupling portion at least partially overlaps an exterior surface of the first portion and an exterior surface of the second portion.

15. The fishing equipment carrier of claim 14, wherein the plurality of slots comprises a first slot formed in the first portion, a second slot formed in the second portion, and a third slot formed in the coupling portion.

16. The fishing equipment carrier of claim 15, wherein the third slot is wider than the first slot and the second slot.

17. The fishing equipment carrier of claim 15, wherein the first portion comprises a first rod holder and a second rod holder, and wherein the first slot is disposed between the first and second rod holder.

18. The fishing equipment carrier of claim 13, wherein the plurality of slots are longitudinally aligned.

19. The fishing equipment carrier of claim 13, wherein the mounting foot further comprises a strap configured to extend around a vehicle accessory of the vehicle, and a fastening mechanism configured to tighten the strap on the vehicle accessory to secure the fishing equipment carrier on the vehicle.

20. The fishing equipment carrier of claim 19, wherein the fastening mechanism comprises a shaft and a fastener coupled to the shaft and the strap.

* * * * *